United States Patent [19]
Maroney

[11] Patent Number: 5,925,119
[45] Date of Patent: Jul. 20, 1999

[54] COMPUTER ARCHITECTURE FOR AUTOMATED STORAGE LIBRARY

[75] Inventor: John Edward Maroney, Chino Hills, Calif.

[73] Assignee: Quantum Corporation, Milpitas, Calif.

[21] Appl. No.: 08/828,438

[22] Filed: Mar. 28, 1997

[51] Int. Cl.⁶ .................................................. G06F 13/40
[52] U.S. Cl. .......................................................... 710/126
[58] Field of Search ................................ 369/34, 36, 37; 711/4; 710/100, 101, 126, 128, 129

[56] References Cited

U.S. PATENT DOCUMENTS

| | | | |
|---|---|---|---|
| 4,079,841 | 3/1978 | Castel | 211/131 |
| 4,126,366 | 11/1978 | Handler et al. | 312/202 |
| 4,577,914 | 3/1986 | Stravitz | 312/111 |
| 4,651,863 | 3/1987 | Reuter et al. | 198/399 |
| 4,673,090 | 6/1987 | Crosslen | 211/183 |
| 4,675,856 | 6/1987 | Rudy et al. | 369/36 |
| 4,734,005 | 3/1988 | Blumberg | 414/273 |
| 4,787,533 | 11/1988 | Haroutel et al. | 221/12 |
| 4,815,795 | 3/1989 | Accumanno et al. | 312/12 |
| 4,836,621 | 6/1989 | Teranishi | 360/98.05 |
| 5,121,483 | 6/1992 | Monahan et al. | 395/275 |
| 5,239,650 | 8/1993 | Hartung et al. | 395/650 |
| 5,289,589 | 2/1994 | Bingham et al. | 385/425 |
| 5,377,121 | 12/1994 | Dimitri et al. | 364/478 |
| 5,734,840 | 3/1998 | Chew et al. | 395/282 |
| 5,745,795 | 4/1998 | Pecone et al. | 395/882 |
| 5,751,977 | 5/1998 | Alexander | 395/306 |
| 5,760,995 | 6/1998 | Heller et al. | 360/92 |

FOREIGN PATENT DOCUMENTS

| | | |
|---|---|---|
| 88302706 | 3/1988 | European Pat. Off. . |
| 3918198 | 12/1989 | Germany . |
| 55-157156 | 12/1980 | Japan . |
| 59-60573 | 10/1984 | Japan . |
| 61127503 | 11/1984 | Japan . |
| 60-82509 | 5/1985 | Japan . |

*Primary Examiner*—Ayaz R. Sheikh
*Assistant Examiner*—Xuonk Chung-Trans
*Attorney, Agent, or Firm*—Brown, Martin, Haller & McClain; David B. Harrison

[57] ABSTRACT

A computer architecture for an automated data storage library including a high-speed local bus with support for expansion slots and the ability to transfer data blocks in parallel. The high-speed local bus preferably adheres to industry standards for computers, thus providing the ability in a library to transmit data blocks in parallel on a local bus capable of supporting large bandwidth communications while supporting any expansion or add-in card designed to meet such industry standards. A PCI bus is preferred for the local bus.

58 Claims, 6 Drawing Sheets

COMPUTER ARCHITECTURE FOR AUTOMATED STORAGE LIBRARY

BACKGROUND OF THE INVENTION

1. Field of the Invention

The present invention relates generally to an automated data storage library, and more specifically to a computer architecture including a high-speed local bus having support for expansion slots and the ability to transfer data blocks in parallel.

2. Description of the Related Art

Automated data storage media libraries accessible to host computers outside the library are known. Such a library includes a set of storage bins for housing a collection of peripheral data storage mediums, a set of peripheral data transfer devices for reading and writing data to the media of the storage mediums, and a robotic picker capable of transferring the mediums upon command from the host. Generally, the picker is capable of inserting a data storage medium into, or removing a data storage medium from, a storage bin or a peripheral data transfer device within the library. An automated storage library provides the host processor with economical access to a large amount of data without manual assistance. The library may also be used for backup and archival purposes of data normally stored on the host computer's disk drive.

In order to interface with the host processor and the robotics electronics, the library must have some communications electronics and/or software of its own, i.e. the library typically includes its own custom-designed computer system. The set of wires, paths, or connections for carrying signals throughout a computer system is known as a "bus". Such a bus is divisible along functional lines such that a library computer system may include a data bus, control bus and address bus. A particular set of communication signal protocols is typically used on a bus, depending upon such factors as the computer system components, the configuration of such components, and the bus pathing scheme. Since the protocols and communications within a library are so specialized, the bus schemes of libraries are therefore typically customized to meet the special needs of a library. The addition of a new type of peripheral data transfer device to the library, such as a new high-speed optical disk device, or new type of communications interface, such as fiber optic cable media, typically requires more hardware and/or software to support the addition.

Some prior art libraries communicate internally with a serial interface, such as an RS-232 interface. Serial communications consist of sequential data transfers. On the other hand, parallel communications include multiple data transfers that happen simultaneously. Parallel buses offer far more cost-effective high-speed communications whenever only short distances are involved, such as within the confines of a computer or library. It would therefore be an economical advantage to provide a library with internal parallel communications.

Up to now, a typical library and any peripheral data transfer devices have communicated with the host through a standard interface called the "Small Computer System Interface" or SCSI for short. The SCSI interface is a family of specifications for a bidirectional, peripheral data transfer device bus and command set. The specifications define a high performance interface that distributes data among peripherals independently of a host processor. The specifications include SCSI-1, SCSI-2, and SCSI-3, and all are governed and available from the American National Standards Institute (ANSI).

Generally, a SCSI bus provides a computer system with data transfer device independence within a class of devices, such as disk drives or tape drives. Different devices within a particular class can thus be added to a computer system without major modification of the system hardware or software.

Nevertheless, it is foreseeable that the higher bandwidth of fiber optics media and the interface and communications standards required to support such higher bandwidth communications may soon obsolesce or at least greatly supplement some SCSI standards. Ultra-SCSI is one attempt within the SCSI specification to increase the bandwidth of SCSI, and other interface protocols specifically designed with fiber optic bandwidths are probably also suitable for very high-speed data transport. For example, Fibre Channel is an interface designed to handle the high data transfer rates (currently up to about 100 Megabytes per second (MBps)) possible with fiber optics. Fibre Channel handles both data channel and network communications and may be used to carry data channels that include the SCSI protocol and may also carry network packet protocols including the Internet Protocol (IP) and Asynchronous Transmission Mode (ATM). ATM is a non-synchronous (i.e., not tied to a master clock) protocol that, among other uses, makes the broadband integrated services digital network (B-ISDN) possible. It is used for video on demand, live television, and generally for high-speed data transport for science, industry, and entertainment, and communications over telephone lines. The need to support such high-speed host interfaces and high-speed network interfaces is not typically addressed in libraries of the prior art, and those that have addressed it have done so with economically undesirable solutions.

It is possible to interface with high-speed host communications, including providing a high-speed Fibre Channel interface to a library, by building a proprietary interface including a communications bus. But such a proprietary bus would have to be redesigned if the interface or communications standards change in the future, with inherent economic disadvantages.

A further consideration for libraries is that the era of the stand-alone computer, such as a desktop personal computer (PC), that is not networked with other computers, in either a client/server or peer-to-peer fashion is largely vanishing as industry and educational institutions carry on the migration of stand-alone to local area network, to wide area network, and further progression to use of the Internet to set up institutional wide intranets. Consequently, the demands on servers is greater than ever, and the data access, and data backup requirements are greater than ever before, with no end in sight. Automated data storage libraries must be available to perform both functions, faster and at least as reliably as before while such faster communications increase demands for data by the growing numbers of computer users.

Moreover, such storage libraries will have a need to communicate directly with the network through such network protocols as Ethernet (IEEE 802.3), fast Ethernet (IEEE 802.3u), token ring (IEEE 802.5), and the fiber distributed data interface (FDDI) which is a high-performance fiber optic token ring network. Of course, standards not even in existence today will need to be supported and without the need for the library communications pathway or bus being redesigned.

In view of the above, it would be an advancement in the art to provide a bus in a data storage library that can support high-speed communications without slowing down or bottlenecking the data transfer and which also imparts the capability for support of industry standard cards for expansion purposes, and so the library's communication pathways do not have to be redesigned to support future growth.

SUMMARY OF THE INVENTION

To overcome the problems described above and those which will become apparent upon reading the detailed description below, a new architecture for an automated data storage library is provided. The new library includes a high-speed local bus having support for expansion slots and the ability to transfer data blocks in parallel. The parallel communications enable the bus to transfer the data blocks rapidly.

Preferably, the high-speed local bus includes an industry standard bus so that for the first time in an automated storage library the ability to transmit data blocks in parallel on a local bus capable of supporting large bandwidth communications also has the capability to accept and support any card designed to meet such industry standards. In this way such a bus will not have to be redesigned to accept different interface standards as long as these standards can communicate with the industry standard bus.

Preferably the high-speed local bus meets the Peripheral Component Interconnect (PCI) specification.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings in which identical numbers in various views represent the same or similar elements, and wherein.

DESCRIPTION OF PREFERRED EMBODIMENTS

Figure 1:
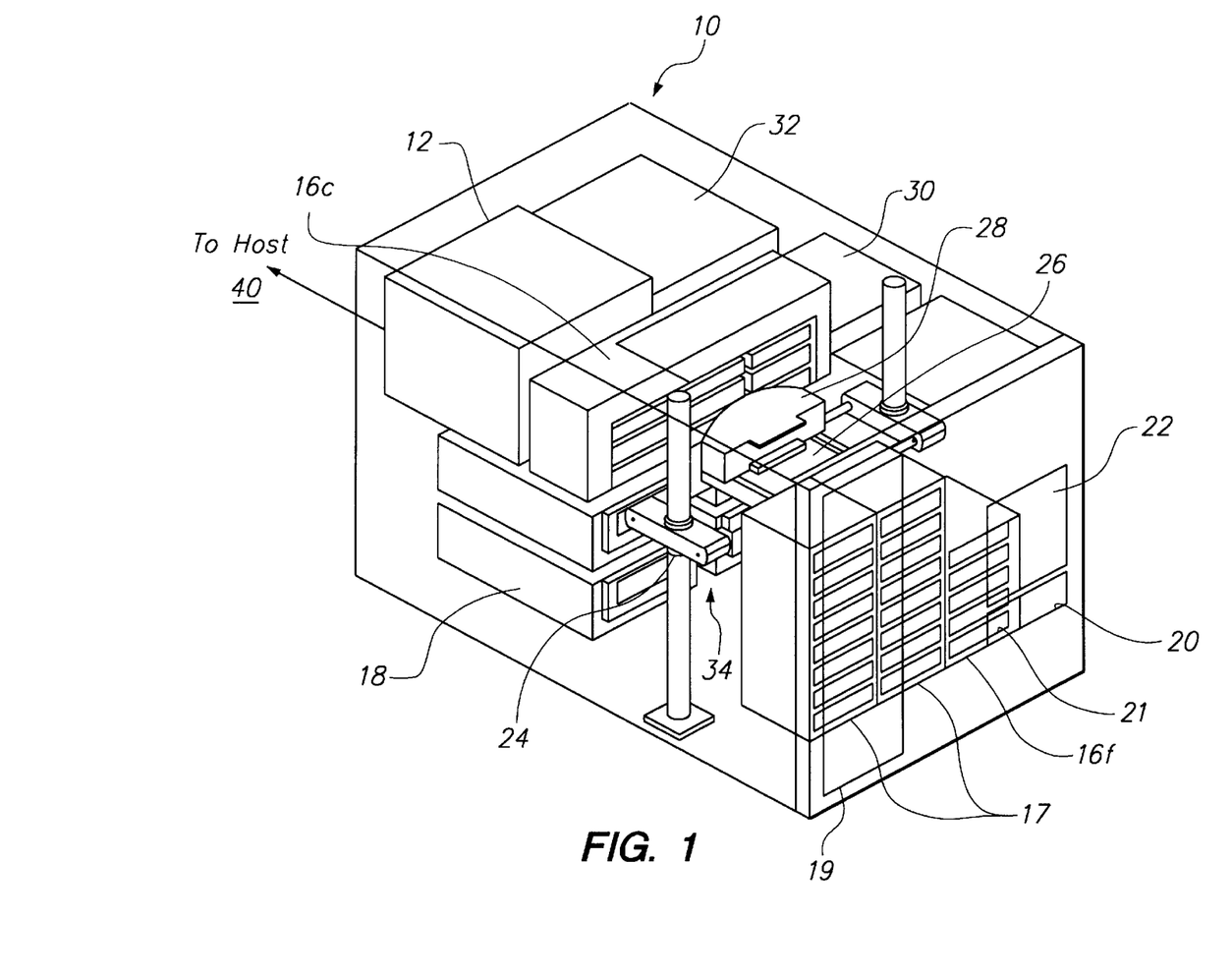
FIG. 1 is a simplified overview of an automated storage library useful with the computer architecture of the present invention.

FIG. 1 shows a simplified overview of an automated storage library 10 useful with the computer architecture of the present invention as discussed below with reference to FIGS. 2 through 7. The library 10 is presented merely as an exemplary library that is useful with the computer architecture of the present invention. One example of an automated tape storage library that represents such a library that could be adapted to be useful with the computer architecture of FIGS. 2–5 is the ATL 4/52 automated tape library available from ATL Products, Incorporated of Irvine, Calif.

Regarding nomenclature used in this specification, data is used generally in this specification to refer to information suitable for communication, interpretation, or processing within a computer system. Nevertheless, data may refer to different types of information according to the context in which it is used. For example, in the context of a data transfer device, data generally refers to information that may be read from or written to the data medium. On the other hand, data on a bus may include such data that may be written to or read from the data transfer device and may also include control information.

With reference again to FIG. 1, the library 10 includes a set of storage bins 16r and 16f (rear and front positions, relative to the overall library, respectively) for housing a collection of data storage mediums 21 that may have data written to or read from them by data transfer device 18, which preferably is a DLT (tm) tape drive, distributed by Quantum Corporation. An exemplary data storage medium 21 may be a DLT (tm) cartridge for data communication with DLT (tm) drive 18. Nevertheless, it should be clear to those skilled in the art that any type of removable data storage medium and any type of data transfer device useful for such a medium may be used in library 10 without deviating from the spirit or scope of this invention.

Library 10 also may include removable load packs 17, insertable through access port 19. The library 10 includes a load port 20 for inserting and removing a data storage medium. A control panel 22 is useful for allowing the operator of the library to recognize the status of library operation, and for limited user control of the library. Library 10 includes a picker 34, which includes a vertical carriage 24, a horizontal rotational extension platform 26, and a gripper mechanism 28 for grasping and transferring a data storage medium between one of the storage bins and the data transfer device. A viewing window 30 is useful for an operator to view operation of the picker 34 to verify its operation and for trouble-shooting.

The library 10 includes an electronics assembly 12 for communicating with a host computer 40 that resides outside of the library, and for controlling operation of the library, including operation of the picker 34. The electronics assembly includes various electronic devices described below with reference to FIGS. 2–7. The electronics assembly 12 and the various motors (FIG. 7) for operation of the movable components in the library are powered by a power supply 32. The power supply may be, for example, a 300 watt power supply of the type useful within a normal PC. The host computer 40 may be any type of computer that may need to access data or have data stored in the library. For example, the host computer may be a Sun Microsystem Sparc Server.

The library shown in FIG. 1 is a small library; however, this invention is useful with a library of any size having more or fewer data storage mediums and more or fewer data transfer devices. This invention is also useful within a library that communicates with any type of host computer, including a mainframe or personal computer.

Figure 2:
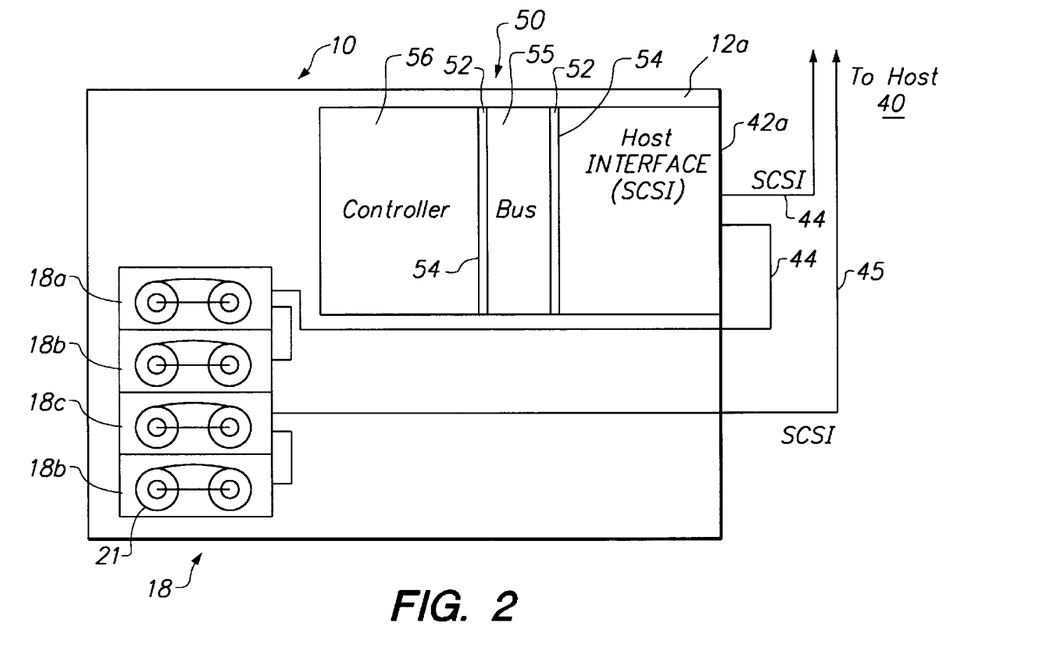
FIG. 2 is a block diagram of one embodiment of a computer architecture of the present invention including a high-speed local bus with a SCSI interface to a host computer.

FIG. 2 is a block diagram showing a simplified overview of the computer architecture of automated data storage library 10 in communication with host processor 40 which resides outside of library 10. In this embodiment, electronic assembly 12a includes a host interface module 42a that includes a small computer systems interface (SCSI), preferably designed in accordance with the well-known SCSI-2 standard. The SCSI interface communicates along SCSI bus 44 to a first tape drive 18a which is electrically wired in a daisy-chain topographical configuration to a second tape drive 18b of the data transfer devices 18. A second SCSI bus 45 communicates directly with a third tape drive 18c which is daisy chained to a fourth tape drive 18d. In this fashion, the host simply sees each of the tape drives and the library robotics as a SCSI target.

SCSI buses 44 and 45 may each be a "Narrow" SCSI bus or a "Wide" SCSI bus. A Narrow SCSI bus is 8-bit wide and a Wide SCSI bus is 16-bit wide.

Figure 3:
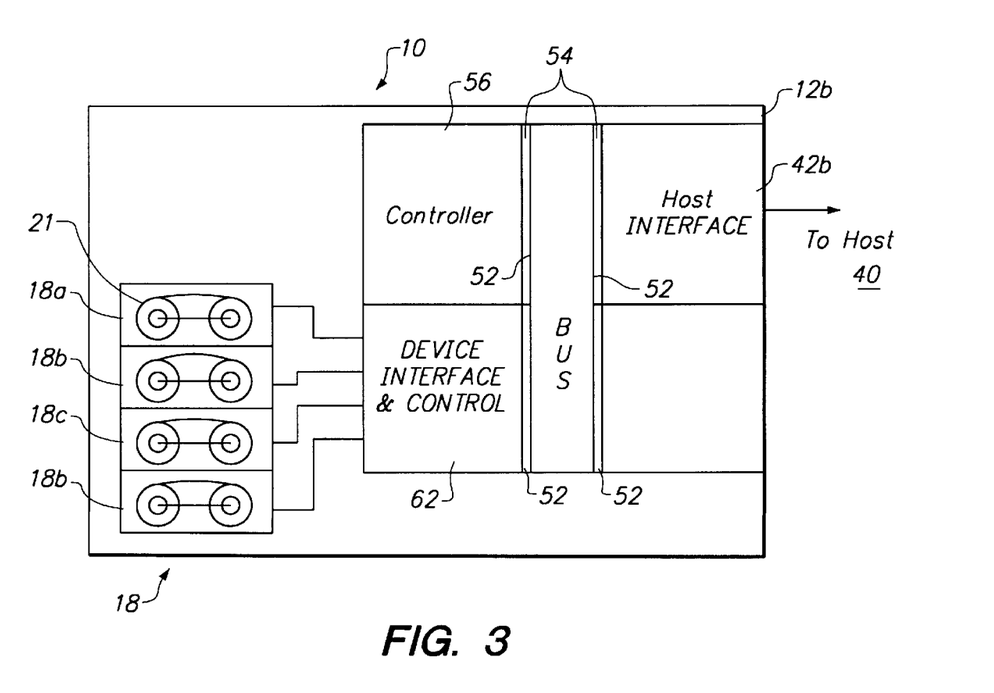
FIG. 3 is a block diagram of another embodiment of the computer architecture of the present invention including the high-speed local bus of FIG. 2 and also including a high-speed communications interface to the host computer and data transfer device interface and control logic for improving performance and reliability for the library of FIG. 1.

SCSI commands are well-known in the art and are available from the ANSI standards organization and include SCSI-2, which is preferable for the embodiment shown in FIG. 2, and SCSI-3 which is best implemented by the embodiment of FIG. 3. Typical SCSI commands to library 10 from the host include "Move Medium" which specifies a source element and a destination element. Elements may include storage elements, such as storage bins in the library, an import/export element, such as a load port 20, and a data transfer device 18, such as a tape drive. Elements further include a medium transport element such as picker 34 (FIG. 1) in library 10. The bins in load pack 17 can be either import/export elements, or storage elements. To understand what elements are available in the library, the host may use SCSI command "Mode Sense." In response to this SCSI command, the library will give its specifications, including number of storage elements, number of import/export elements, number of data transfer elements and number of medium transport elements. It should be recognized that the number of transport elements such as the picker may include more than one picker in the library.

Further SCSI commands available to the host for managing the library include "Read Element Status", to which the library would respond with whether or not a cartridge is present, and if present with certain identification and status information. It is the responsibility of the host to keep up with the location of the particular data in the library, i.e., which cartridge contains the media on which that data is stored. There are various ways to identify cartridges including placing barcode labels on their housing which may be read by appropriate devices. The SCSI command "Initialize Element Status" causes such a barcode label to be read. A SCSI command "Inquiry" requests specific identification information about the library.

Referring again to FIG. 2, Library 10 includes a high-speed local bus 55 which may include at least one industry standard expansion slot 52 coupled to the bus. Each module that interfaces with the bus includes a bus interface 54. In a preferred embodiment, the bus is the well-known peripheral component interconnect (PCI) bus. The PCI bus is a high-speed local bus having its own clock (FIG. 7) as specified in the PCI specification. The PCI local bus specification, revision 2.1 describes such a preferred local bus. It is available from the PCI Special Interest Group of Portland, Oreg.

The PCI bus is configured for transferring data blocks in parallel so that the library bus does not become a bottleneck for data communications when using high-speed host communications such as Fibre Channel as discussed below. In the particular embodiment shown in FIG. 2, the PCI bus communicating with a SCSI interface offers the advantages of supporting many expansion slots due to its selectable clock speed between 0 and 66 Megahertz (MHZ), which in a preferred embodiment is selected between 25 and 66 MHZ; good choices are for example, 25 or 33 MHZ. It is well-known that a faster clock speed requires a shorter bus. Buses that use a CPU clock may have to support speeds currently up to 100 MHZ and therefore have short buses with fewer expansion slots. Therefore, one advantage of choosing a PCI bus 55 in library 10 is its clock speed that is separate from the CPU bus and is optimized for performance while supporting many expansion slots. Nevertheless, one may choose any type of high-speed local bus having at least one industry standard expansion slot for supporting future upgrades to the library without deviating from the spirit and scope of this invention and as long as the local bus is configured for transferring data blocks in parallel so that the bus does not become a bottleneck for data transmission in the library. However, the inventor has critically recognized problems leading to such bottlenecks and that the PCI bus eliminates many such problems while introducing economical and performance advantages within a library. Now combined for the first time with an automated data storage library, the local bus of the present invention supports high-speed communication and supports upgrades through the expansion slots of the bus without any need to redesign the bus whatsoever.

Figures 5, 6:
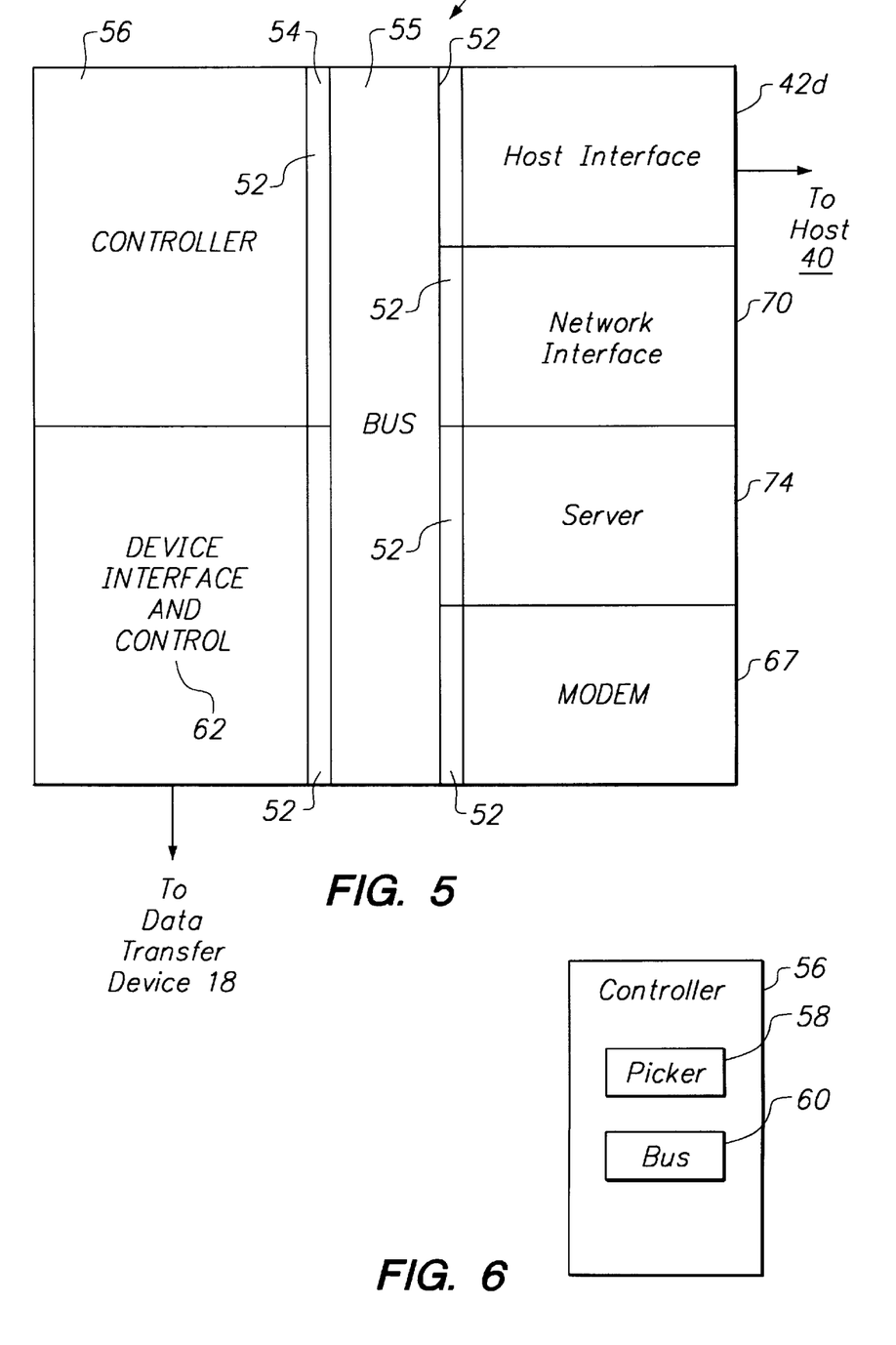
FIG. 5 is a block diagram showing another embodiment of the computer architecture of the present invention including the high-speed local bus of FIG. 2 and the high-speed communication interface to the host computer and data transfer device interface and control logic of FIG. 3 and also include a network interface to the network, an embedded server, and remote access means.
FIG. 6 is a block diagram showing various controller logic modules operational with the architecture of FIGS. 2–5.

Referring again to FIG. 2, the library 10 includes controller logic module 56 coupled through bus interface 54 to local bus 55 for controlling elements in library 10, including picker 34. FIG. 6 shows that controller logic module 56 logically may include picker controller logic circuitry 58 and bus control logic circuitry 60. The inventor has recognized that there are certain advantages to packaging the logic circuitry modules 58 and 60 together on one electronic card. In that case, a particular card may represent controller logic 56, which may then be plugged into an expansion slot 52 to communicate through bus interface 54 with local PCI bus 55. Nevertheless, it should be recognized by those skilled in the art that each control logic circuit, such as picker logic circuitry 58 and bus controller logic circuitry 60 may be separately embodied and not packaged together on a card that interfaces with bus 55 through an expansion slot 52. Moreover, all the control logic circuitry may be configured directly onto a motherboard that includes bus 55 in the configuration of normal PC architecture.

The embodiment described above with reference to FIG. 2 is useful in small libraries; however, the slow speed of the SCSI-2 interface is a limiting factor when a significant number of data transfer devices are employed in library 10. For this reason an advantageous architecture for supporting high-speed communications, or large libraries, is shown in FIGS. 3 and 4.

Figure 4:
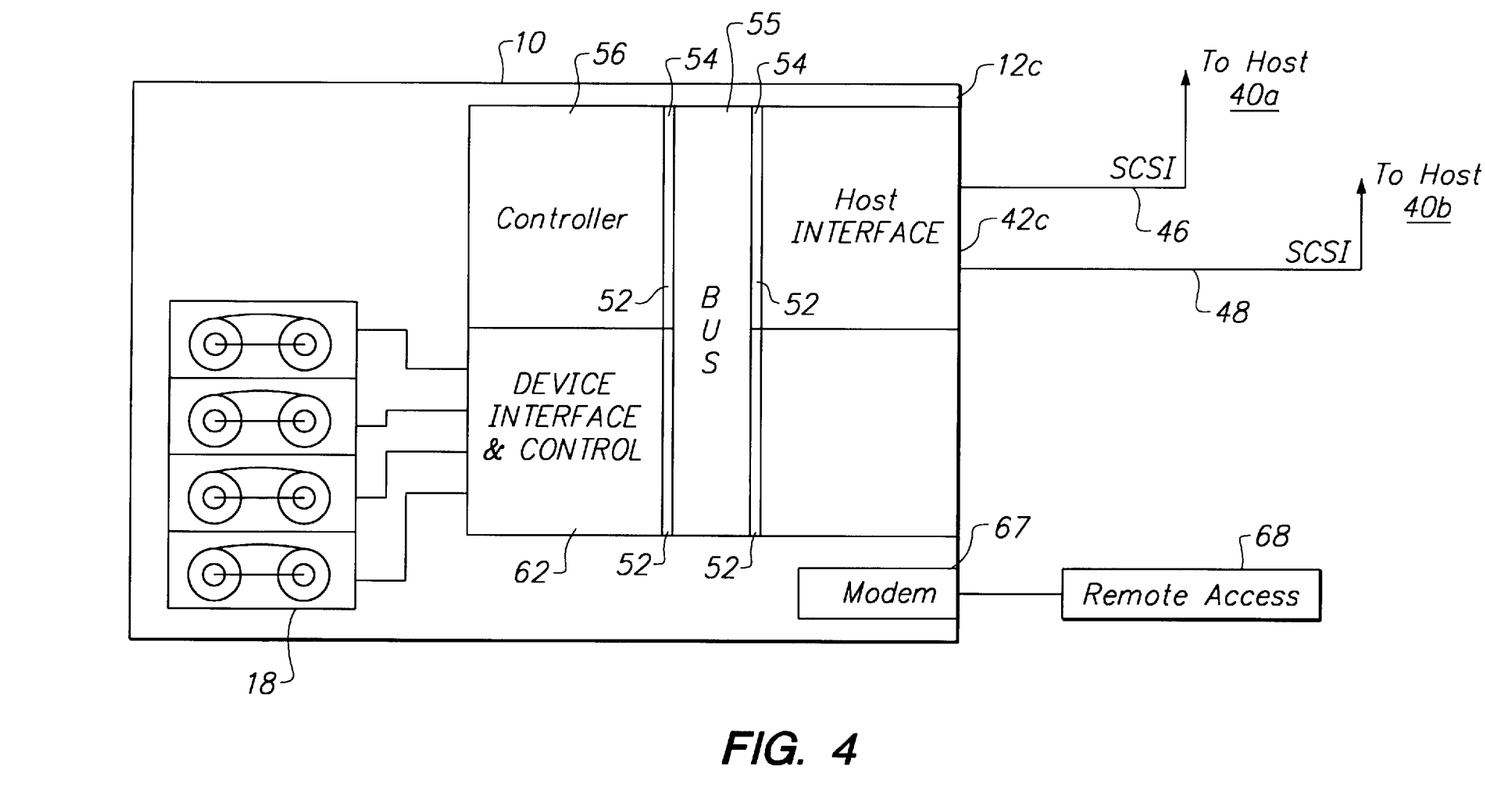
FIG. 4 is a block diagram of another embodiment of the computer architecture of the present invention including the high-speed local bus of FIG. 2 and 3 and a remote access means and also including multiple communications interfaces to multiple host computers for improving access to the library of FIG. 1.

FIG. 4 shows a host interface including dual port SCSI support for supporting multiple hosts. Bus 55 may include one or more expansion slots 52 similar to the embodiment shown in FIG. 2. In the configuration shown in FIG. 4, dual hosts 40A and 40B may share the library 10 through host interface 42c through bus 55 to directly control data transfer devices 18 through device interface and control logic module 62. When multiple hosts share a single library, they can share the same picker, load ports, and data transfer devices by remapping SCSI addresses as required. This has a further advantage of distributing the cost of a single library over multiple hosts. On the other hand, it is not preferred to share tape cartridges since the particular data desired by a host is identified as being stored on particular data cartridges. Thus, automated routing of data through the dual SCSI interfaces through the PCI bus improves system availability over prior art libraries for multi-host applications, thereby ensuring improved access to data for an automated data storage library.

Since Fast and Wide SCSI supports data transfer at about 20 Megabytes/second (MB/s), and DLT (tm) can support data transfer rates up to 10 MB/s, the inventor has recognized the critical need for supporting high-speed communications through the parallel local PCI bus through device interface and control logic module 62. Thus, host interface module 42b shown in FIG. 3 may include support for Fibre Channel (100 MB/s), Fast 20 or Ultra-SCSI (40 MB/s for Wide 16-bit, and 20 MB/s for Narrow 8-bit), Fast SCSI-2 (20 MB/s for Wide 16-bit, and 10 MB/s for Narrow 8-bit), and the Serial Storage Architecture (SSA) interface (80 MB/s). Thus, the architecture shown in FIG. 3 can support fiber optic based high-speed host interfaces, as well as high-speed network interfaces (discussed below) because of the implementation of the high-speed local bus capable of transmitting data blocks in parallel, which preferably a PCI bus.

Particular advantages of the local bus with parallel communications as implemented in the library architectures described above, with reference to FIGS. 2–5 include those now discussed. Generally, a local bus can be thought of as a way for different peripherals in a computer to read to or write from main memory quickly. However, in the implementation of a library a local bus includes the characteristic of being localized within the library or the library's computer system, i.e. it doesn't span long distances, in contrast to a SCSI bus. Conversely, a non-local bus is essentially an extension of the Central Processor Unit (CPU) bus or communication path that the CPU uses to access main memory. In some descriptions, a definition of a local bus might be called a mezzanine bus because of its characteristic of being one step removed from the CPU bus. Also a general communications type of non-local bus, such as SCSI, may span long distances outside of the library or the library's computer system and is therefore not appropriate as the local bus of this invention. Thus, for example, referring to FIG. 7 (discussed in more detail below), the electronic assembly 12 includes a CPU or microprocessor. Since local bus 55 is a separate bus, isolated from the CPU but having access to main memory, it includes its own clock which is another advantage of a local bus. Preferably, a good choice for the local bus 55 is the PCI bus whose specification is known.

The expansion slots 52 and bus 55 provide support for local area network or other networking components and for hard disk drive interfaces such as the SCSI interface for hard disk drives so that the architecture of this library will support the inclusion of an embedded server, discussed below with reference to FIG. 5. For the first time, the inventor has made the critical recognition that a local bus supporting parallel data block transfers with support for future expansion interfaces for supporting industry standard electronic cards is a critical advancement for automated data storage libraries.

The speed of the local bus is important in that it affects how quickly data can be transferred and the cost of add-in peripherals. Another factor is the number of input/output (I/0) or add-in peripherals the bus can support. Since the local bus is provided with its own clock 72 (FIG. 7), separate from the built-in clock of any on-board microprocessors, it can support many low-cost peripherals because it can support many expansion slots, as discussed above. In a preferred embodiment, which includes a PCI local bus, the bus may run at 33 Megahertz, a speed recognized in the computer art as well-known suited for designing high-performance affordable peripherals (the higher the clock speed, generally the more expensive the peripheral). When local bus 55 is embodied as the preferred PCI bus, the local bus 55 can theoretically support up to 16 "PCI loads", wherein each populated expansion slot, such the number of as expansion slot 52, counts as 2 PCI loads. The PCI specification recommends limiting PCI loads to 10, and therefore a practical limit on the number of expansion slots is 5. Each slot supports its own I/O and/or other communication cards. Conversely, when a non-local bus is used that relies on a microprocessor clock, it is essentially an extension of the CPU bus. But a higher frequency microprocessor bus cannot support a large number of devices because the bus must be short in length. This results in limiting the number of slots and thereby limiting the expansion of the library and the number of peripherals which may be in the library. Thus, the local bus 55 is advantageous over prior art non-local buses.

When local bus 55 is implemented as a PCI bus, it can be expanded to support a 64-bit data bus, allowing for an easy interface to future CPUs, such as those manufactured by Sun Microsystems or Digital Equipment Corporation. Moreover, the PCI bus is a good choice because it includes parallel data transfer and therefore will not become a bottleneck like a serial bus, such as that used with the popular RS-232 serial interface. Since the preferred PCI bus allows for future expansion, it will not be necessary to redesign the architecture of communications path in the library 10 to support a faster host interface, since the local bus 55 has its own clock 72 and is therefore independent.

Local bus 55, when implemented as the preferred PCI bus, is a 32-bit bus, running at 33 Megahertz, and thus yielding a 132 MB/s peak throughput rate, and when running at 25 MHZ a 100 MB/s peak rate for block transfer of data blocks in parallel is supported. Thus, it allows data transfer devices and library 10 to take full advantage of available processing so that the bus does not become a bottleneck for data communication. The PCI bus is a good choice for bus 55 because the PCI bus supports the data transfer rates discussed above and is upgradable to 528 megabytes per second. Another advantage of implementing a PCI bus is that most suppliers of network interface controller chips including Ethernet, fast Ethernet and ATM (Asynchronous transfer mode) now offer a PCI interface for their components.

Referring again to FIG. 4, remote access for management of the picker or data transfer devices 18 through library 10 may be made through a remote device such as a modem 67 connected to remote access communication means 68 which may include appropriate communication lines such as telephone lines and a computer interface (not shown).

The architecture described above with reference to FIGS. 3–4 provides enhanced fault tolerance and improved performance, particularly in a library having multiple data transfer devices because it is well known that drives may be more likely to fail than any other component of the library including the picker 34. Because the host may communicate through a device interface and control module 62 to each particular data transfer device, the local control logic can switch the drive when a failed one is requested. This particular architecture allows for the implementation of "automatic drive fail over," which is simply moving to another drive if a particular drive requested is not available.

The architecture of this invention also supports the well-known techniques of device mirroring and using redundant array of independent data transfer devices, i.e., a "RAID" type of architecture for tape drives, sometimes referred to as a RAIT or redundant array of independent tape drives.

Referring to FIG. 5, an advanced configuration of the architecture of library 10 is shown. Similar to other embodiments, it includes local bus 55 implemented as a PCI bus, including multiple expansion slots 52 for communicating with a host interface module 42d which may be any of the SCSI-1 through SCSI-3 interfaces, including Ultra-SCSI, Fibre Channel, or SSA. The bus may also interface with a network interface logic card 70 for communicating with Ethernet, Fast Ethernet, FDDI, or ATM. Thus, a server 74 may be embedded in the library and it may include its own on-board CPU (not shown), and main memory (not shown) as is well-known in the PC art. The embedded server 74 may communicate with the network interface 70 for serving any requesters on the network. In such an arrangement, external communication with the host may or may not exist. In other words, with the network interface, external host communications are optional. An embodiment with a network interface may be thought of simply as a "network storage appliance" because it includes an embedded dedicated storage server with any necessary software for performing the back-up function as a part of the library itself, and thus reducing the cost of secondary storage because no separate back-up server is required outside the library. Further, this simplifies installation and maintenance of the library and of any drives, such as tape drives, within the library. Additionally, only one single connection to the network is needed to increase reliability and simplify troubleshooting. The parallel local bus supporting communications is at the heart of making the network storage appliance configuration possible. The embodiment shown in FIG. 5, includes the controller module 56 as described above and includes picker control logic module 58 and bus control logic 60. For communications with data transfer devices 18, the library 10 includes the device interface and control logic module 62, similar to the architectural embodiments described above with reference to FIGS. 2–5.

Figures 7, 7A:
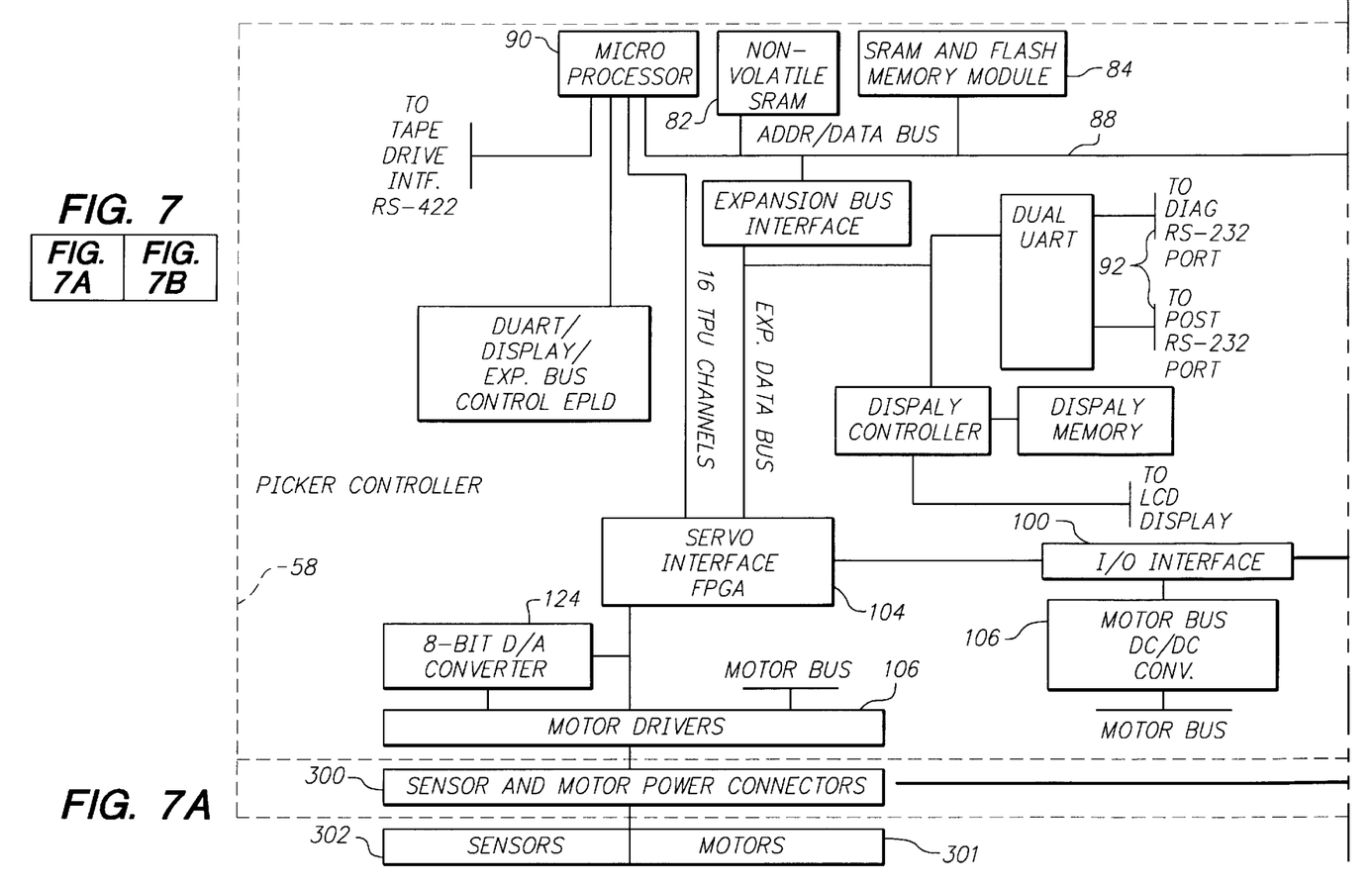
FIG. 7 is an exemplary overview block diagram of component arrangement for implementing the embodiment of FIG. 2 for use with the library of FIG. 1.
Figure 7B:
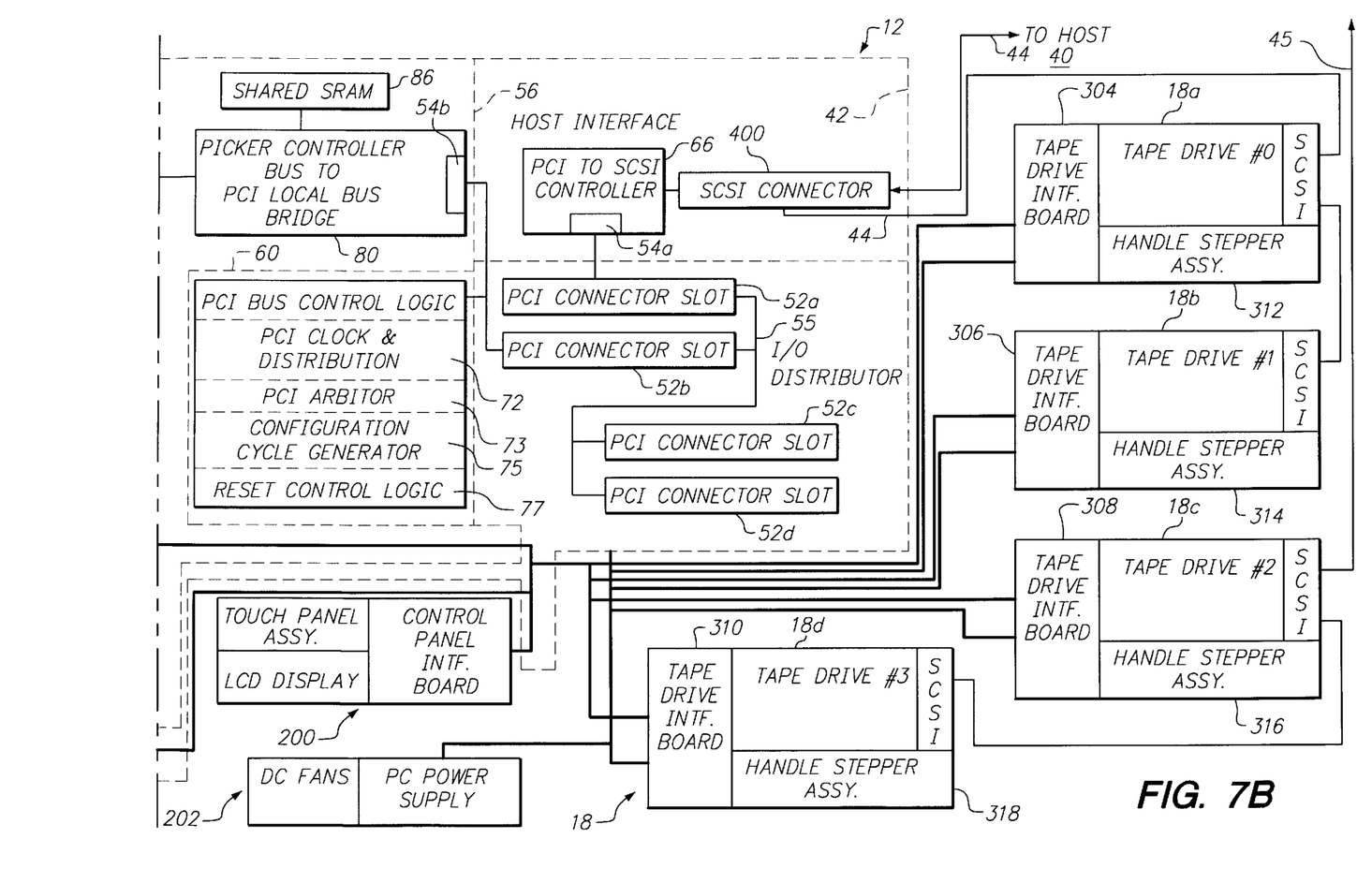

An example of an implementation for operation of library 10 using the architecture of FIG. 2, is shown in FIG. 7. It is now described in brief overview fashion for simplicity, and those components shown but which are well-known to those skilled in the art are not discussed. The PCI bus 55 serves as the local bus having its own PCI clock 72 as described above. PCI connector slots 52 are available for expansion, including PCI connector slots occupied by the picker controller module 56 and the host interface module 42 which in this particular embodiment is simply a SCSI card.

Components useful for carrying out the SCSI communications are shown on the host interface module 42 and include a PCI to SCSI controller 66. The PCI to SCSI controller 66 communicates with the host through SCSI connector 400 and reformats the SCSI data so that it can be communicated through the PCI bus interface 54a and the PCI expansion slot 52a to the PCI bus 55.

The picker controller logic module 58 includes a picker controller bus to PCI bus bridge 80 for communication between the two buses. The picker controller bus to PCI bus bridge 80 includes a PCI bus interface 54b for interfacing with the PCI bus 55 through the PCI expansion slot 52b. On-board memory on the controller card includes nonvolatile static random access memory (SRAM) 82, SRAM and flash memory module 84, and SRAM 86 that is shared between the Picker bus and the PCI bus. Address data bus 88 carries communication through the controller's bus and to PCI bridge 80 and then to PCI bus 54. In this particular exemplary embodiment, bus control logic 60 and picker controller logic 58 are preferably included together on one card, which communicates with PCI bus 55 through bus interface 54b and PCI connector slot 52b.

The PCI bus control logic 60 includes a PCI bus arbiter 73, PCI clock and distribution of the clock logic 72, reset and control logic 77, and configuration cycle generator 75. Each of these is now discussed. The PCI bus arbiter 73 is required to support multiple devices on the bus. A PCI device must first request use of the PCI local bus from the arbiter. The arbiter then grants the PCI device use of the bus based on a round-robin style priority fairness algorithm to avoid deadlocks. Once a PCI device is granted use of the bus by the arbiter, the bus must go idle in order for that PCI device to claim the bus. Once the bus is claimed by the PCI device, it will continue to own it until it has completed the current data transfer.

The configuration cycle generator 75 decodes configuration commands and an addressing number used to identify the target PCI device and bus and then generates a proper signal to address a particular designated device on the PCI bus. The reset control logic 77 provides a stable power-on bus reset and deals with select signals during and after the reset.

As discussed above, the PCI clock and distribution logic 72 are needed to provide a local bus clock for all PCI devices on the bus. The clock frequency will practically range from 25 megahertz to 66 megahertz, depending on back plane design and number of card slots on the PCI bus.

The clock distribution is needed to duplicate the PCI clock, because no more than two PCI loads should be on any single clock line in order to prevent excessive clock skew which can be no more than 4 nanoseconds at 33 megahertz.

An on-board microprocessor 90 executes commands to operate Picker 34 (FIG. 1) in response to communications with host 40 through host interface 42. Optionally, serial ports may be available as shown at serial ports 92 to communicate directly with the host, through an RS-232 interface. Other components, shown as apart of picker controller modular 58 are well-known in the art and therefore are not discussed.

I/O interface 100 provides sensor inputs from sensors 302 through sensor and motor connector 300 to servo interface field programmable gate array (FPGA) 104 which, in coordination with microprocessor 90, controls the picker actuators through motor drivers 106. Motor drivers 106 control the motor current sent through sensor and motor power connectors 300 to motors 301.

A touch panel and display assembly 200 for interfacing with control panel 22 (FIG. 1) communicates directly with I/O interface 100 and the display controller. Fans and power supply shown in module 202 are necessary for cooling and powering the components of the invention and reside in power supply 32 (FIG. 1).

Each of the tape drives 18a through 18d has attached to it a tape drive interface board 304 through 310, which are each used to communicate control and status information through a RS-422 serial port between the drive and microprocessor 90. Each tape drive interface board 304 through 310 also routes motor power and control information between the handle stepper assembly 312 through 318 and the I/O interface 100 and the sensor and motor power connectors 300. Each handle stepper assembly 312 through 318 is used to open and close the DLT (tm) tape drive handle so that cartridges can be inserted into, or removed from, the tape drives 18a through 18d. Each tape drive interface board 304 through 310 also routes direct current power to the tape drive from the power supply 202. The tape drive interface boards 312 through 318 are not used to route SCSI data to the tape drives. Instead, each tape drive is in direct communication with the host through the SCSI bus as shown in FIG. 2, discussed above.

A library having modular architecture based on a parallel local bus such as an industry standard PCI bus has been described above that is capable of supporting high-speed host interfaces, high-speed network interfaces and including embedded server with backup software. The library described is capable of supporting hardware interfaces such as SCSI, Ultra-SCSI, Fibre Channel, SSA, Ethernet, Fast Ethernet, FDDI and ATM. Other interfaces may be supported as long as they are industry standard and communicate with the preferred local PCI bus.

Other embodiments and configurations may occur to those skilled in the art in view of these teachings. For example, the coupling of the various logic through expansion slots is simply one choice for implementing the architecture, but the architecture described above can also be implemented with the use of a dedicated motherboard, or even as software implemented in main memory on a card in the expansion slots, or on the bus directly through use of a motherboard. Also, other local buses other than the PCI bus may work equally well by conforming to the limitations of this invention as described in the claims. Also, the data storage mediums and associated data transfer devices may be other removable media formats besides tape, such as CD-ROM and optical disks. Therefore, the spirit and scope of this invention is not to be limited by anything other than the appended claims and their equivalents.

What is claimed is:

1. An automated data storage library in communication with a host computing environment, the library comprising:
   a plurality of storage bins, each bin capable of storing a data storage medium therein;
   a data transfer device capable of receiving, ejecting, and communicating data to and from, the data storage medium;
   a picker capable of transferring a data storage medium between one of the storage bins and the data transfer device;
   picker controller logic circuitry having local control paths coupled to the picker for controlling the picker;
   a host computer interface module for connecting the automated library to the host computing environment via a host path external to the library and also having an industry standard local bus connector;
   a high-speed local bus directly connected without cables to the picker controller logic circuitry and to at least one industry standard expansion slot, the local bus configured for transferring data blocks in parallel; and
   the high-speed local bus defining at the industry standard expansion slot a bus interface for directly coupling the picker controller logic circuitry to the host computer interface module when the host computer interface module is directly connected via said connector and without cables to the industry standard expansion slot.

2. The automated data storage library of claim 1, further comprising bus communications controller logic circuitry directly connected to the high-speed local bus.

3. The automated data storage library of claim 2, wherein the local bus is directly connected without cables to a plurality of industry standard expansion slots and wherein the bus communications controller logic circuitry comprises a bus communications controller logic module and the picker controller logic circuitry comprises a picker controller logic module, each said module being coupled to the high-speed local bus through respective ones of the plurality of industry standard expansion slots.

4. The automated data storage library of claim 1, wherein the high-speed local bus is directly connected without cables to a plurality of industry standard expansion slots and wherein the picker controller logic circuitry includes a module directly connected without cables to the high-speed local bus through a said one of the industry standard expansion slots.

5. The automated data storage library of claim 1, wherein the high-speed local bus is directly connected without cables to a plurality of industry standard expansion slots, wherein the automated data storage library comprises a plurality of separate data transfer devices, and further comprising data transfer device interface and controller logic circuitry for routing data to a selected one of the data transfer devices via a cabled device data interface, the data transfer device interface and controller logic circuitry being directly connected without cables to the high-speed local bus.

6. The automated data storage library of claim 5, wherein the data transfer device interface and controller logic circuitry comprises a module which includes a Small Computer System Interface (SCSI interface) as the cabled device data interface.

7. The automated data storage library of claim 6, wherein the SCSI interface implements one of a SCSI-2 and SCSI-3 standard interface.

8. The automated data storage library of claim 5, wherein the device data interface of the data transfer device interface and controller logic circuitry includes a plurality of SCSI interfaces, each SCSI interface being connected by cable to one of the plurality of separate data transfer devices.

9. The automated data storage library of claim 5, wherein the device data interface of the data transfer device interface and controller logic module includes a Fibre Channel interface connected to the plurality of separate data transfer devices.

10. The automated data storage library of claim 1 wherein the high-speed local bus is directly connected to a plurality of industry standard expansion slots and wherein the data transfer device interface and control logic circuitry comprises a module for direct connection without cables to the high-speed local bus through a second slot of the plurality of industry standard expansion slots.

11. The automated data storage library of claim 1, wherein the high-speed local bus includes a bus controller having a controllable local bus clock, and wherein the high-speed local bus has a bus width of at least thirty-two bits, and supports a parallel data transfer burst rate of at least one hundred megabytes per second.

12. The automated data storage library of claim 1, wherein the high-speed local bus is a Peripheral Component Interconnect (PCI) bus.

13. The automated data storage library of claim 1, wherein the host computer interface module includes a Fibre Channel interface for connecting the automated library to the host computing environment.

14. The automated data storage library of claim 1, wherein the host computer interface module includes a SCSI interface for connecting the automated library to the host computing environment.

15. The automated data storage library of claim 14, wherein the SCSI interface implements one of a SCSI-2 or SCSI-3 standard interface.

16. The automated data storage library of claim 14, wherein the host computer interface module includes an Ultra-SCSI interface for connecting the automated library to the host computing environment.

17. The automated data storage library of claim 1, wherein the host computer interface module includes a SSA interface for connecting the automated library to the host computing environment.

18. The automated data storage library of claim 1, wherein the high-speed local bus is directly connected without cables to a plurality of industry standard expansion slots, and further comprising a network interface module for providing the host path and being directly connected without cables to the high-speed local bus via one of the plurality of industry standard expansion slots.

19. The automated data storage library of claim 18, wherein the network interface module includes an Ethernet interface for connecting the automated library to the host computing environment.

20. The automated data storage library of claim 18, wherein the network interface module includes a Fast Ethernet interface for connecting the automated library to the host computing environment.

21. The automated data storage library of claim 18, wherein the network interface module includes an FDDI interface for connecting the automated library to the host computing environment.

22. The automated data storage library of claim 18, wherein the network interface module includes an Asynchronous Transfer Mode (ATM) interface for connecting the automated library to the host computing environment.

23. The automated data storage library of claim 1, wherein the high-speed local bus is directly connected to a plurality of industry standard expansion slots and further comprising a server module directly connected without cables to the high-speed local bus at a said one of the plurality of industry standard expansion slots.

24. The automated data storage library of claim 1, wherein the data storage medium comprises a tape cartridge having at least one reel carrying a spool of magnetic recording tape.

25. The automated data storage library of claim 1, comprising a housing comprising a power supply connected to receive power from a primary power source, and including the plurality of storage bins, and wherein the data transfer device, the picker, the picker controller logic circuitry, the host computer interface module, and the high-speed local bus are within the housing and obtain operating power from the power supply.

26. The automated data storage library of claim 25, wherein the housing includes a user-accessible display/control panel connected to the picker controller logic.

27. The automated data storage library of claim 25, wherein the housing includes a load port comprising a data storage medium import/export element enabling loading of a said data storage medium for access and handling by the picker.

28. The automated data storage library of claim 25, wherein the data storage medium comprises a cartridge, wherein at least some of the data storage bins are formed by a removable load pack, and wherein the housing includes a load pack access port for receiving said load pack.

29. The automated data storage library of claim 25, wherein the housing includes a viewing window for enabling an operator to observe internal mechanical operation of the library.

30. The automated data storage library of claim 1, wherein the host computer interface module supports an industry standard network connection to the host computing environment.

31. The automated data storage library of claim 1, wherein the picker controller logic circuitry includes a programmed microprocessor, local controller memory, a picker controller bus directly connected to the programmed microprocessor and local controller memory, and a picker-controller-bus-to-high-speed local bus bridge for directly connecting the picker controller bus and the high-speed local bus without cables.

32. The automated data storage library of claim 1, wherein the picker controller logic circuitry and the high-speed local bus and bus interface including the at least one industry standard expansion slot are formed on a single circuit card.

33. The automated data storage library of claim 1, wherein the high-speed local bus and bus interface includes a plurality of industry standard expansion slots and is formed as a card separate from a card comprising the picker controller logic circuitry, the picker controller logic circuitry comprising a module including an industry standard connector for connecting to a said expansion slot.

34. The automated data storage library of claim 1, further comprising a telephone modem for connecting the library to a remote monitoring/control location via a telephone path connection.

35. The automated data storage library of claim 1 wherein the picker controller logic circuitry is coupled to the data transfer device for controlling data storage medium receiving and ejecting operations of the data transfer device.

36. A computer architecture for an automated storage library in communication with at least one host computer, the library including a plurality of storage bins, each bin capable of storing a cartridge containing a data storage medium therein, a data transfer device capable of communicating data to and from the data storage medium, a picker capable of transferring a cartridge between one of the storage bins and the data transfer device, the computer architecture comprising:

a picker controller logic module electrically coupled via a picker interface to the picker for controlling the picker and having a high-speed local bus interface;

a host computer interface module for connecting the library to the at least one host computer and further having a high-speed local bus interface;

a high-speed local bus configured for transferring data blocks in parallel including a plurality of industry standard expansion slots coupled thereto for electrically connecting modules having high-speed local bus interfaces; and the high-speed local bus for directly coupling the picker controller logic module and the host computer interface module together when the picker controller logic module and the host computer interface module are connected without cables to the high-speed local bus at respective ones of the plurality of industry standard expansion slots.

37. An automated data storage library in communication with a network, the library comprising:

a plurality of storage bins, each bin capable of storing a data storage medium therein;

at least one data transfer device capable of communicating data to and from the data storage medium;

a picker capable of transferring a data storage medium between one of the storage bins and the data transfer device;

a picker controller logic circuit electrically coupled via control and monitoring paths to the picker for controlling the picker;

a network interface for connecting the automated library to the network;

a high-speed local bus configured for transferring data blocks in parallel; and, a bus interface being disposed for directly coupling the picker controller logic circuit and the network interface to the high-speed local bus without cables.

38. The automated data storage library of claim 37, wherein the high-speed local bus includes at least one industry standard expansion slot, further comprising a plurality of data transfer devices, and further comprising a data transfer device interface and controller logic module directly coupled to the high-speed local bus via said expansion slot without cables and connected by cables to said plurality of data transfer devices.

39. The automated data storage library of claim 37, wherein the high-speed local bus includes at least one industry standard expansion slot and further comprising a server module directly coupled without cables to the high-speed local bus via said expansion slot.

40. The automated data storage library of claim 39, wherein the server module comprises a server central processing unit and a server main memory.

41. The automated data storage library of claim 39, wherein the server module is connected to the network via the network interface.

42. The automated data storage library of claim 37, wherein the high-speed local bus includes a plurality of industry standard expansion slots and further comprising a data transfer device interface and controller logic module and a server module, each being directly coupled without cables to the high-speed local bus via respective ones of the plurality of industry standard expansion slots.

43. A computer architecture for an automated storage library in communication with a network, the library including a plurality of storage bins, each bin capable of storing a cartridge containing a data storage medium therein, a data transfer device for receiving a said cartridge and for communicating data to and from the data storage medium of the said cartridge, a picker for transferring a cartridge between one of the storage bins and the data transfer device, the computer architecture comprising:

picker controller logic electrically connected to the picker for controlling the picker and having a picker-to-local bus interface;

a network interface for connecting the automated storage library to the network and having a network-to-local bus interface;

a high-speed local bus configured for transferring data blocks in parallel and including one or more industry standard expansion slots coupled thereto, the picker-to-local bus interface and the network-to-local bus interface for directly coupling without cables the picker controller logic and the network interface via the high speed local bus.

44. An automated data storage library in communication with a host computer, the library comprising:

a housing, a power supply within the housing for converting electrical power from a primary power source to operating power, a plurality of storage bins, each bin capable of receiving a cartridge containing a magnetic tape data storage medium therein;

at least one magnetic tape data transfer device within the housing and connected to the power supply and capable of communicating data to and from the magnetic tape data storage medium of a said cartridge;

a picker within the housing and connected to the power supply for automatically transferring a cartridge between one of the storage bins and the magnetic tape data transfer device;

picker controller logic circuitry within the housing and connected to the power supply and including a programmed microprocessor, a local microprocessor memory, and a picker controller bus interconnecting the programmed microprocessor and the local microprocessor memory and coupled to the picker for automatically controlling the picker, in response to picker commands received at the library and stored in the local microprocessor memory via a picker-controller-bus-to-high-speed-local-PCI-bus bridge;

a host computer interface module within the housing and connected to the power supply, for connecting the library to the host computer, and having a host-to-local bus interface;

a high-speed local PCI bus within the housing and connected to the power supply, and having a local clock and being configured for transferring data blocks including said picker commands in parallel and including one or more industry standard PCI expansion slots directly coupled thereto without cables; and said picker-controller-bus-to-high-speed-local-PCI bus bridge for directly coupling the picker controller logic circuit to the high-speed local PCI bus without cables, and said host-to-local bus interface for directly coupling without cables the host computer interface module to the high-speed local PCI bus at a said standard PCI expansion slot.

45. The automatic data storage library of claim 44 wherein the library comprises a plurality of magnetic tape data transfer devices within the housing and connected to the power supply each device including a device data interface, and further comprising a data transfer device interface and controller logic module directly coupled to the high-speed PCI local bus without cabling at said one or more industry standard PCI expansion slots and connected to each of said plurality of magnetic tape transfer devices at a respective device data interface.

46. A library computer architecture for an automated data storage library in electrical communication with a digital information network, the library including a housing defining a plurality of cartridge storage bins, each bin capable of storing a cartridge containing a data storage medium therein, the housing containing at least one data transfer device capable of receiving the cartridge and thereupon communicating data to and from the data storage medium thereof, a picker capable of transferring a cartridge between one of the storage bins and the data transfer device, and a power supply and circuitry of the computer architecture, comprising:

a picker controller logic circuit including a programmed microprocessor and a local memory and electrically connected to the picker via a local control and status interface for controlling the picker and having a high-speed local bus interface for receiving, storing in the local memory, decoding and executing data blocks comprising host computer commands directed to the picker;

a network connection circuit for receiving at least library commands from computing resources of the digital information network via a network interface and having a high-speed local bus interface; and, a high-speed local bus directly connected without cables to the picker controller logic circuit and to the network connection circuit, and configured for transferring data blocks in parallel including said computer commands directed to the picker directly between at least the network connection circuit and the picker controller logic circuit, said high-speed local bus having at least one industry standard expansion slot enabling a circuit module having a high-speed local bus interface to be directly connected without cables to, and used within, the library computer architecture.

47. The library computer architecture of claim 46, wherein the high-speed local bus includes a bus clock distributor, a configuration cycle generator, an arbiter, and a reset control logic circuit.

48. The library computer architecture of claim 47, wherein the high-speed local bus comprises a parallel bus width of at least thirty-two parallel bit lines.

49. The library computer architecture of claim 48, wherein the high-speed local bus is in accordance with an industry standard PCI local bus specification.

50. The library computer architecture of claim 46, wherein the picker controller logic circuit connects to the high-speed local bus via an industry standard connector which is received at a said industry standard expansion slot of the bus.

51. The library computer architecture of claim 46, wherein the network connection circuit connects to the high-speed local bus via an industry standard connector which is received at a said industry standard expansion slot of the bus.

52. The library computer architecture of claim 46, wherein the at least one data transfer device is connected to the digital information network via the high-speed local bus.

53. The library computer architecture of claim 52, wherein the at least one data transfer device is connected to the digital information network via the network connection circuit.

54. The library computer architecture of claim 46, further including a data transfer device interface and controller logic module having a high-speed local bus interface and electrically coupled to the high-speed local bus via a said industry standard expansion slot.

55. The library computer architecture of claim 54, comprising a plurality of data transfer devices connected to the digital information network via the data transfer device interface and controller logic module.

56. The library computer architecture of claim 46, further comprising a server module including a server central processing unit and a server memory, the server module having a high-speed local bus interface and electrically coupled to the high-speed local bus via a said industry standard expansion slot.

57. The library computer architecture of claim 46, wherein the data transfer device includes the high speed local bus and including a picker controller to local bus bridge for connecting the picker controller to the local bus.

58. The library computer architecture of claim 46, wherein each cartridge unit includes an electrically controlled cartridge receiver assembly for receiving and ejecting a cartridge, and the picker controller logic circuit automatically operates the cartridge receiver assembly via the local control and status interface picker controller logic module side bus.

* * * * *